US00RE46998E

(19) United States
(12) Reissued Patent
Bludorn

(10) Patent Number: US RE46,998 E
(45) Date of Reissued Patent: Aug. 21, 2018

(54) LIQUID SAMPLE BULK MAILING PACKAGE DEVICE

(71) Applicant: Richard Clarence Bludorn, Mesa, AZ (US)

(72) Inventor: Richard Clarence Bludorn, Mesa, AZ (US)

(21) Appl. No.: 14/953,013

(22) Filed: Nov. 26, 2015

Related U.S. Patent Documents

Reissue of:
(64) Patent No.: 8,590,771
Issued: Nov. 26, 2013
Appl. No.: 13/109,536
Filed: May 17, 2011

U.S. Applications:
(60) Provisional application No. 61/345,197, filed on May 17, 2010.

(51) Int. Cl.
*B42D 15/00* (2006.01)
*B65D 27/00* (2006.01)
*B65D 27/38* (2006.01)

(52) U.S. Cl.
CPC ..... *B42D 15/00* (2013.01); *B65D 27/00* (2013.01); *B65D 27/005* (2013.01); *B65D 27/38* (2013.01); *B65D 2221/00* (2013.01)

(58) Field of Classification Search
CPC ..... B42D 15/00; B65D 27/38; B65D 27/005; B65D 27/00; B65D 2221/00
See application file for complete search history.

(56) References Cited

U.S. PATENT DOCUMENTS 2,045,944 A * 6/1936 Domke ..... 229/92.8
2,124,324 A * 7/1938 Weeks ..... B65D 75/28 206/466
3,784,086 A * 1/1974 Forbes, Jr. ..... B65D 27/04 206/278
4,105,116 A 8/1978 Jones et al.
4,941,574 A 7/1990 Meehan
4,998,621 A 3/1991 Meehan
5,119,952 A 6/1992 Warriner, Jr.
5,160,022 A 11/1992 Mennella
(Continued)

OTHER PUBLICATIONS

Richard Clarence Bludorn conducted testing of potential mailer designs in U.S. Postal Service facilities prior to May 17, 2010. Details of the circumstances of the testing (dates, locations, designs, and personnel) is being confirmed and will be provided in a supplemental Information Disclosure Statement. It is understood the design included an envelope formed from paperboard coated on one side with a semi-permeable coating, a panel with a picture frame cutout having a plastic window, and a liquid packette mounted on paperboard and underneath the window.

(Continued)

*Primary Examiner* — Jeffrey L Gellner
(74) *Attorney, Agent, or Firm* — David L. Narciso

(57) ABSTRACT

A liquid sample bulk mailing packaging device includes a paperboard envelope blank assembled to form a hermetically sealed leakproof containment pocket such that a moisture resistant coating on *at least* one of the paperboard surfaces will prevent leakage in the event an enclosed liquid containing packette fails during mail processing, while *if uncoated* the other paperboard surface will absorb the moisture from the packette. The device meets the US Postal Service requirements for machinable and automation letters.

52 Claims, 5 Drawing Sheets

(56) References Cited

U.S. PATENT DOCUMENTS

| | | | | |
|---|---|---|---|---|
| 5,607,101 | A | 3/1997 | Saito | |
| 5,648,143 | A * | 7/1997 | Mehta et al. | 229/92.3 |
| 6,213,303 | B1 | 4/2001 | Harris et al. | |
| 6,230,964 | B1 | 5/2001 | Saito | |
| 6,287,652 | B2 | 9/2001 | Speckhale et al. | |
| 6,301,860 | B1 | 10/2001 | Gunderman et al. | |
| 6,326,069 | B1 | 12/2001 | Barnett et al. | |
| 6,607,078 | B2 | 8/2003 | Pedroli et al. | |
| 6,688,467 | B2 | 2/2004 | Krupka et al. | |
| 6,929,128 | B2 | 8/2005 | Caldwell et al. | |
| 7,007,831 | B2 | 3/2006 | Pennaneach et al. | |
| 7,565,975 | B2 | 7/2009 | Baker et al. | |
| 2003/0054140 | A1 * | 3/2003 | Matsumoto | B41M 5/508 428/195.1 |
| 2005/0031887 | A1 * | 2/2005 | Finestone | B32B 27/08 428/537.5 |
| 2008/0023532 | A1 | 1/2008 | Moresi | |
| 2010/0230481 | A1 * | 9/2010 | Emmott | 229/313 |

OTHER PUBLICATIONS

Unpublished document: Declaration of Richard Clarence Bludorn, dated May 30, 2013.
Unpublished document: Letter from Charles M. Tricamo, Manager, National Customer Rulings for the US Postal Service, dated Apr. 24, 2009.

* cited by examiner

LIQUID SAMPLE BULK MAILING PACKAGE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Provisional Patent Application Ser. No. 61/345,197 filed May 17, 2010, which is incorporated by reference in its entirety. *This U.S. patent application is a Reissue Application of U.S. patent application Ser. No. 13/109,536 filed May 17, 2011, now U.S. Pat. No. 8,590,771 granted Nov. 26, 2013.*

TECHNICAL FIELD

This disclosure generally relates to a bulk mailing packaging device and, more particularly, to a letter size bulk mailing packaging device with improved features to contain liquid samples.

BACKGROUND

Many manufacturers of cosmetics, toiletries, beauty and skincare products, etc. commonly promote their products by distributing free samples to current or potential consumers with the goal of building and/or maintaining customer loyalty for the products or product lines. One method of distributing such samples has been to give them to potential customers in a store in which the product is specifically sold. A more effective method has been mailing packages containing sample packettes to a targeted audience through the U.S. Postal Service (USPS).

Mail packages distributed through the USPS have been mailed either under a non-discounted rate classification or under a more economical bulk rate classification. To qualify for classification under the bulk mail rate, each mail package must comply with certain guidelines set by the USPS, including size requirements based on length, height and thickness, and further requiring the length/height aspect ratio be within a certain range. The requirements for obtaining the bulk mail rate are documented in the USPS Domestic Mailing Manual (DMM).

When the sample packette contains a fluid and/or volatile composition such as a liquid, USPS guidelines also require that the mailing package must be capable of being processed by bulk mail sorting equipment through delivery without leakage of any liquid. As used herein, "liquid" refers to any liquid, creme, lotion, color cosmetic, gel, paste, or other fluid product, and any aromatic, fragrance or other volatile product in any form, such as sachet, that could potentially leak or evaporate from the sample packette containing the liquid if the sample packette, which is the primary liquid retention device, fails at any point during bulk mail processing through delivery to the recipient. A liquid containing sample packette shall be referred to subsequently as a "sample liquid packette."

Not later than May 2008 the USPS DMM requirements could be met by packaging, referred to as "cartons," that were relatively thick (up to ¾ inch) and sturdy but which still qualified for a low bulk mail rate. Some bulk mailers utilized plastic to wrap liquid sample bulk mailing packages in order to meet liquid leakage prevention requirements. The USPS bulk mailing package requirements were changed as the USPS changed equipment. The new requirements were included with modifications to the DMM as the DMM was transformed into a series of documents dated May 2008, the entire series of DMM documents incorporated herein by reference in their entirety. In particular, section 201 for "Physical Standards" with its sub-subsection 1.1.1 for "Dimensional Standards for Letters" within subsection 1.1 for "Physical Standards for Machinable Letters;" its subsection 3.0 for "Physical Standards for Machinable and Automation Letters and Cards" with all its sub-subsections; and section 601 for "Mailability" with all its subsections are incorporated herein by reference in their entirety.

The net result of changes to the DMM in May 2008 was that cartons or plastic wrapping used for liquid sample bulk mailing packages were, at a minimum, subject to a substantially higher "large envelope" or "Not-Flat Machinable" bulk mail rate. A lower USPS machine-readable mailing rate applicable to letter size bulk mail is not available for plastic wrapped mailings and is available only for items up to ¼ inch thick that meet other size and flexibility requirements. Cartons are both thicker than ¼ inch and relatively rigid in construction, thus unable to meet the new requirements. Due to the increased costs of mailing through the USPS, manufacturers of liquid products subsequently sought alternative methods to place product samples, including distribution of samples in stores or other location frequented by likely customers, such as malls, convention centers, or cruise ships. Distribution through these methods are not as effective in reaching potential customers likely to purchase a product after trying a sample as previously used targeted mailings, which were based on customer information available to manufacturers and/or their marketers.

Accordingly, there is a need for a liquid sample bulk mailing packaging device that can meet the USPS requirements for obtaining the bulk mail rate for automated/machinable letters. There is also a need for a cost effective liquid sample bulk mailing package assembly method. There is also a need for a liquid sample bulk mailing package that can, without plastic wrapping around the external package surface, prevent leakage or evaporation outside the package in the event of failure of the sample liquid packette from the initial deposit of the package with the USPS through the mail sorting and delivery process to the ultimate recipient.

SUMMARY

A liquid sample bulk mailing packaging device, and method for assembling the device, is provided that enables mailing liquid samples under the US Postal Service requirements for machinable and automation letters. *The liquid sample bulk mailing packaging device features a leak proof containment pocket having a secure perimeter seal and a non-permeable window for product viewing. The containment pocket window may be made from plastic or metalized plastics films. A sample liquid packette having a burst strength meeting USPS requirements to provide a primary sealing means is mounted on a paperboard section that has another paperboard section including the non-permeable window folded over it and glued around the perimeter to provide the perimeter seal, forming the leak proof containment pocket as a secondary seal in the event the sample liquid packette fails. The liquid sample bulk mailing packaging device, the products used in its manufacture, and its*

*methods of assembly, may include features further described in embodiments described below.*

[Paperboard] *In one embodiment paperboard* having sufficient absorption capabilities to absorb liquid in sample packettes is coated on the surface opposite where the packettes are placed such that moisture will not leak from an assembled package in the event of failure of the packettes during the mailing process and instead will be absorbed by the paperboard.

According to one disclosed embodiment, an envelope blank is provided with paperboard having a first side coated with a semi-permeable coating to form a printable surface, print media being placed on at least a portion of the surface and a moisture resistant coating placed on the print media and semi permeable coating. The opposite, second, side of the paperboard is uncoated such that it can absorb moisture. A picture frame cut-out is made in a first panel extending from the top edge with a non-permeable window glued to the second side. A second panel extends from the first panel towards the bottom edge and has a liquid packette mounting area on its second side.

According to another embodiment, a liquid sample bulk mailing packaging device uses an envelope blank made from paperboard having a semi-permeable coated first side that forms a printable surface, print media placed on at least a portion of the printable surface, and a moisture resistant coating overlying the print media and semi-permeable coating. The paperboard's second side is uncoated, providing a moisture absorbing surface. The envelope blank has a first panel extending from a top edge and a second panel adjacent the first panel. A sample liquid packette has a cover film laminated to a backing film and contains a volume of liquid. The sample liquid packette has a burst strength and provides the primary seal for containing the liquid during mailing. The sample liquid packette is glued to a packette mounting area on the second side of the second panel by a fugitive glue. A permanent glue is applied to the perimeter of the packette mounting area from a fold line between the first panel and the second panel, such that the sample liquid packette is encircled by the fold line and the permanent glue. The first panel is folded to, and glued to, the second panel packette mounting area. Once glued, a hermetic seal is formed around the sample liquid packette, providing a secondary seal to prevent any leakage of liquid from the sample liquid packette from escaping the liquid sample bulk mailing packaging device. The liquid sample bulk mailing packaging device is not greater than ¼ inch thick and is within the United States Postal Service requirements for automation letters.

According to a further embodiment, a method of assembling a liquid sample bulk mailing packaging device involves providing an envelope blank formed from one side clay coated paperboard, uncoated on the opposite second side, and preprinted with print media on the clay coated side to provide attractive and informational graphic presentations in a four panel area. A moisture resistant coating overlies the print media, and the first panel includes a non-permeable window glued to its second side. The envelope blank has a top, bottom, and first and second lateral edges. A first tab is cut along the first lateral edge in the first panel near a fold line between the first and second panels, and a second tab is cut opposite the first tab along the second lateral edge. A string is glued to the second side extending from the first tab to the second tab. A fugitive glue is applied to the second side of the second panel for placement of a sample liquid packette. A line of permanent glue is applied to the second side of the second panel around the sample liquid packette from a first fold line between the first and second panels such that when the first panel is folded and glued to the second panel a hermetic seal is formed around the sample liquid packette. Permanent glue is also applied around the periphery of the second side of the third panel and the fourth panel is folded and glued to it. A fugitive glue is then applied to the first side of the first panel, which is then folded towards the fourth panel so the first and fourth panels printed sides are glued together with fugitive glue, enabling easy opening by a mailing recipient. Addressee information is then printed in an address area on the first side of the second panel. This method enables an efficient, cost-effective assembly of letter size envelopes with sample liquid packettes enclosed for mailing at the low machinable, automation letter rate.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1A:
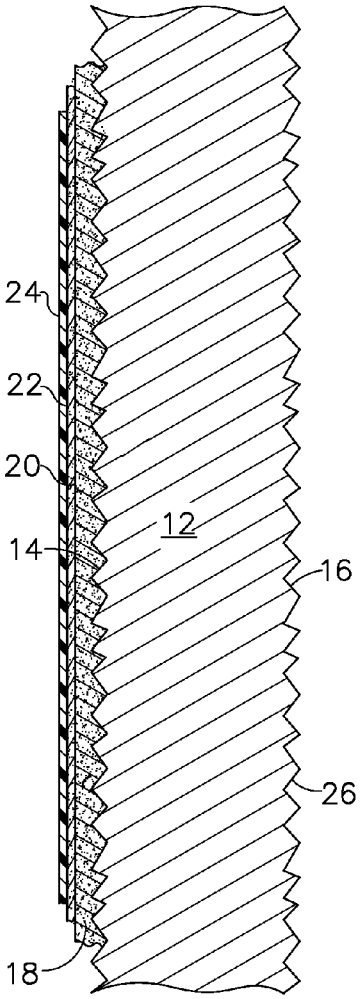
FIG. 1A is an enlarged schematic illustration of a partial cross-sectional view of the diecut blank taken along line 1A-1A of FIG. 1.
Figure 1:
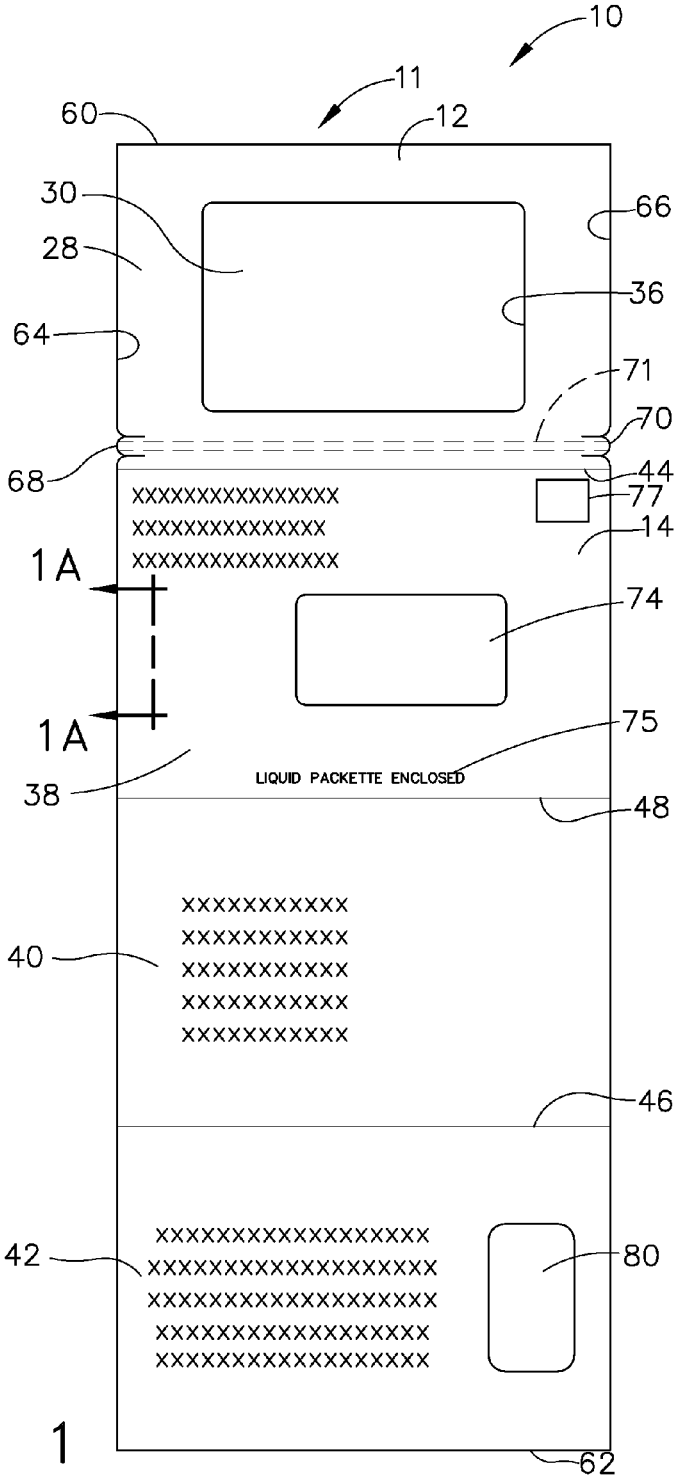
FIG. 1 is an illustration of a plan view of a first side of a die-cut blank for a liquid sample bulk mailing packaging device.

FIG. 1 shows an embodiment of a diecut envelope blank 10 for use in forming a liquid sample bulk mailing packaging device, illustrating a front, printed side 11 of the envelope blank 10. As shown in more detail in an enlarged schematic illustration of FIG. 1A, the envelope blank 10 is made from a paperboard 12 having a first side 14 with a semi-permeable coating 18, such as a clay coating, forming a printable surface 20 and on which print media 22 is placed on at least a portion. A moisture resistant coating 24, such as an aqueous coating, overlies the print media 22 and semi permeable coating 18, while a second side 16 of the paperboard 12 is uncoated on at least a portion, providing an absorbable surface area. While exaggerated for illustration purposes, the raw surfaces of paperboard 12 are not smooth, thus, the semi-permeable coating 18 enhances the ability to apply attractive print media 22.

Figure 2:
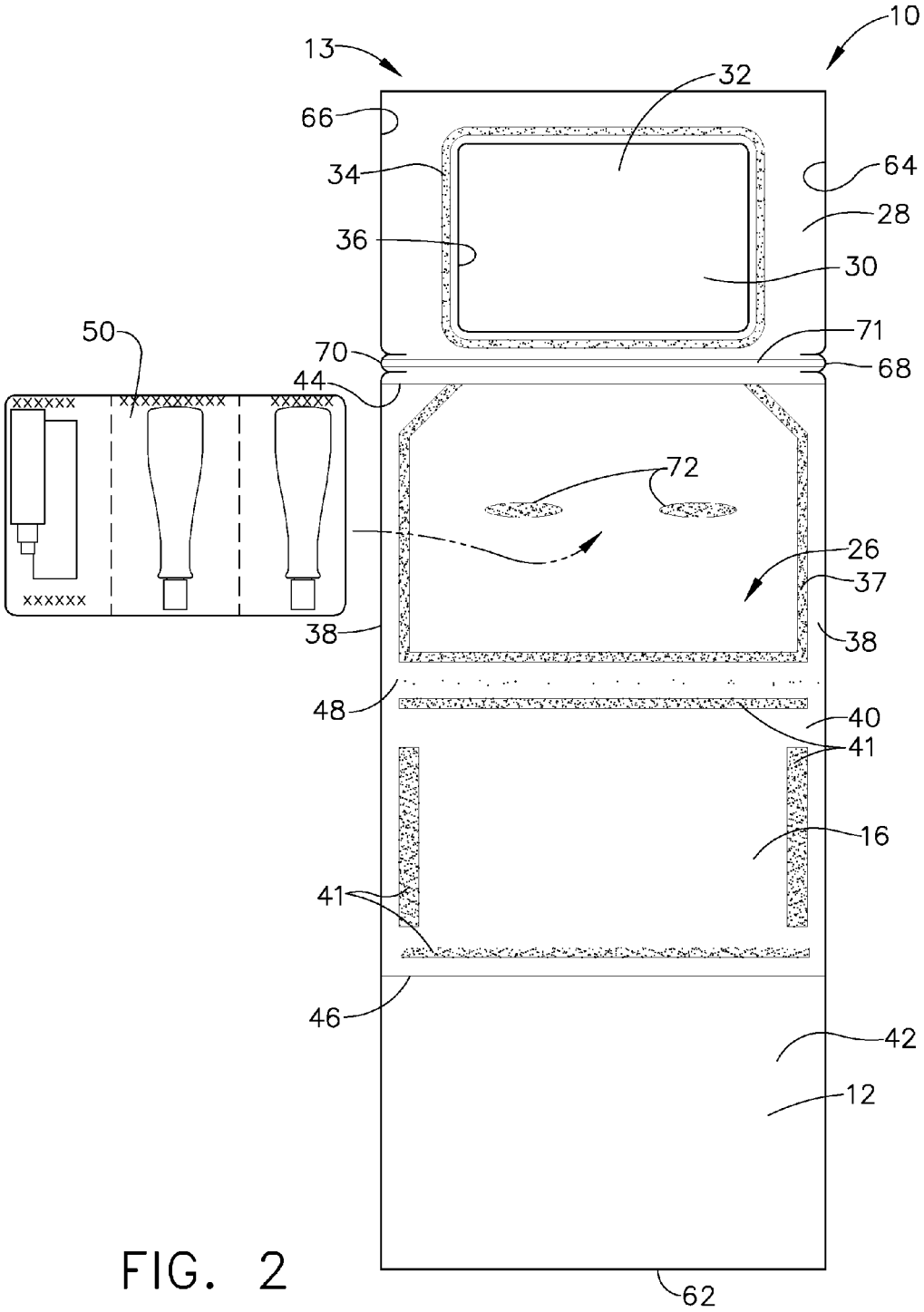
FIG. 2 is an illustration of a plan view of the second side of a die-cut blank of FIG. 1 partway through the assembly process.

As further illustrated in both FIG. 1 and FIG. 2, which depicts the back side 13 of the envelope blank 10 partway through the assembly process in making a liquid sample bulk mailing device, the envelope blank 10 has a top edge 60, a bottom edge 62, a first lateral edge 64, and an opposite second lateral edge 66. In the embodiment illustrated, a four panel envelope blank 10 is shown. A first panel 28 extends from the top edge 60 to a first fold line 44, a second panel 38 extends from the first fold line 44 to a third fold line 48, a third panel 40 extends from the third fold line 48 to a second fold line 46, and a fourth panel 42 extends from the second fold line 46 to the bottom edge 62.

The first panel 28 has a picture frame cutout 30 having print media on the printed side 11 providing an attractive display around a non-permeable window 32, such as a plastic or a metallized plastic film, adhered and sealed to the second side 16 of the paperboard 12, preferably by a permanent glue 34 that has been applied in a continuous line encircling the periphery 36 of the picture frame cutout 30. As used herein, a permanent glue is any adhesive that will bind with at least one of the contacting surfaces in a substantially permanent way such that removal of one surface from the adhered surface will pull a portion of the adhered surface material from its surface. In one embodiment, a first tab 68 is cut along the first lateral edge 64 in the first panel 28 proximate the first fold line 44 and a second tab 70 is cut opposite the first tab 68 along the second lateral edge 66 with a tear string 71 adhered by a permanent glue to the second side 16 extending from the first tab 68 to the second tab 70. In another embodiment, the second tab 70 could be omitted, and the tear string 71 would simply extend towards the second lateral edge 66. The tear string 71 is made from a material that when adhered to the paperboard 12 has a greater tensile strength than the paperboard material itself. In one embodiment, the tear string 71 is a string, such as a flat polyester ribbon about ⅛ inch wide, or any other string material available having sufficient tensile strength.

The second panel 38 includes on the printed side 11 an attractive and informational graphic presentation, a blank address area 74, a marking 75 meeting the USPS requirements indicating that a liquid sample is enclosed, and a bulk mailing permit 77. The back side 13 of the second panel 38 includes an uncoated portion of paperboard 12 providing a packette mounting area 26. A fugitive glue 72 is applied to the packette mounting area 26 by which a sample liquid packette 50 can be adhered to the second panel. As used herein, a fugitive glue is an adherent substance substantially holding two surfaces together but capable of releasing one surface from the other substantially without tearing material from a surface, as is known in the art. A line of permanent glue 37 is applied from the first fold line substantially around the periphery of the area for holding the sample liquid packette 50, such that when the first panel is glued to the second panel a substantially hermetic seal is formed around the liquid packette 50. In the embodiment illustrated, a line of permanent glue 37 extends from proximate the first fold line 44 at a point inward of the first tab 68 extending substantially diagonally outward, towards the first lateral edge 64, and then extending generally parallel to the first lateral edge towards the third fold line 48, then extending generally parallel to the third fold line 48 towards the second lateral edge 66, then extending generally parallel to the second lateral edge 66 towards the first fold line 44, then extending substantially diagonally inward to a point inward of the second tab 70.

The printed side 11 of the third and fourth panels 40, 42 may include attractive and informational graphic presentations, and the third panel may include an information block for coupon placement 80. The back side 13 of the third panel 40 includes permanent glue 41 provided around the periphery of the panel, proximate to and parallel with the second fold line 48, the third fold line 48, the first lateral edge 64, and a second lateral edge 66.

Figure 3:
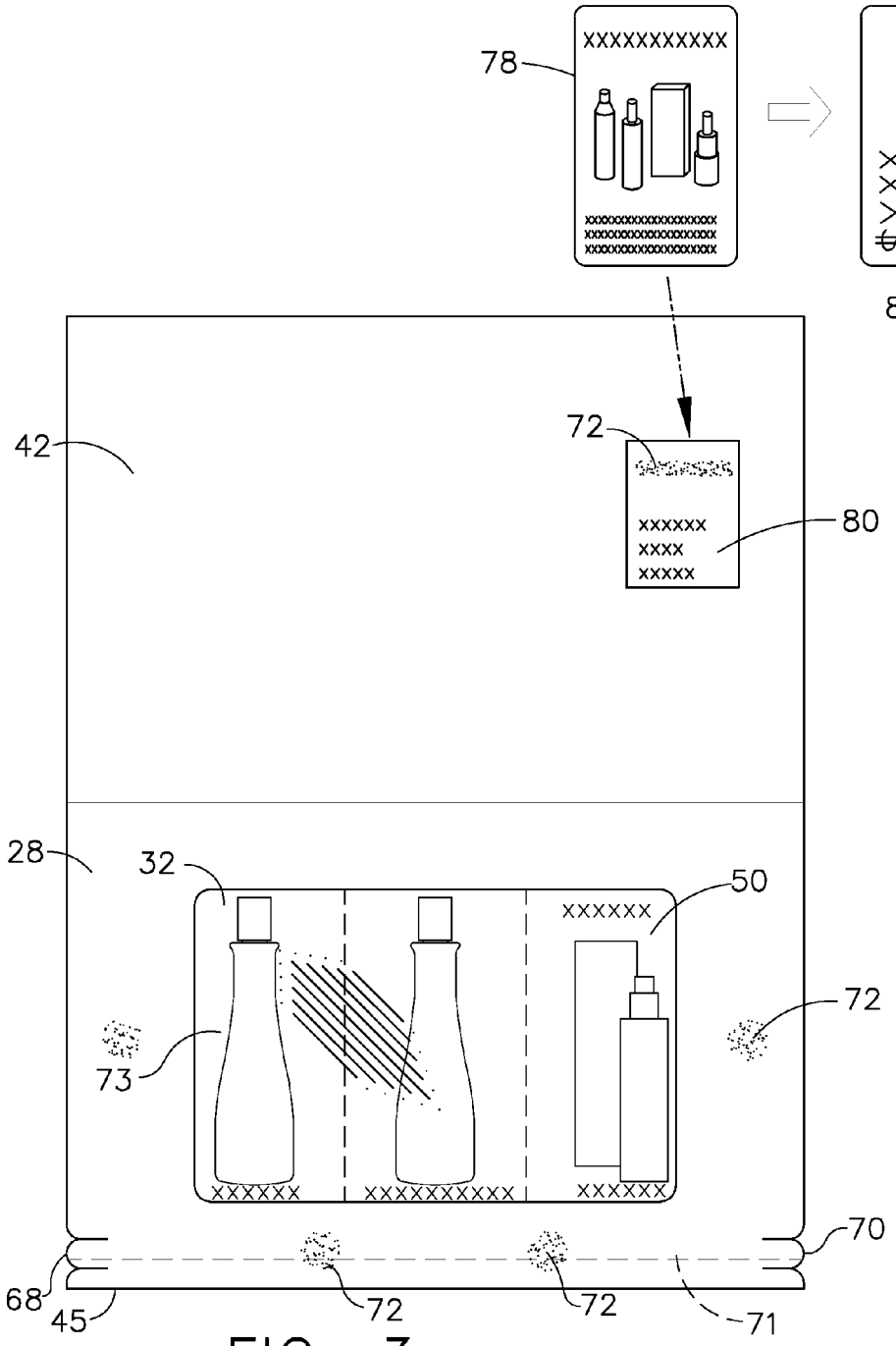
FIG. 3 is an illustration of a plan view of the diecut blank of FIG. 1 after attachment of the sample liquid packette and partial assembly into a liquid sample bulk mailing packaging device.

FIG. 3 shows a partially assembled liquid sample bulk mailing packaging device using the envelope blank 10 after adhering the sample liquid packette 50 to the packette mounting area 26 of the second panel 38, folding the back side 13 of the first panel 28 towards the second panel 38 along the first fold line 44 and gluing to it to the second panel, and folding the back side of the fourth panel 42 towards the third panel 40 along the second fold line 46, with the view rotated 180° from the views of FIG. 1 and FIG. 2 for clarity. A fugitive glue 72 is applied to spots on the first panel 28 proximate the first lateral edge 64, the first fold 45, and the second lateral edge 66, for adhering the first panel 28 to the fourth panel 42 on final assembly, and to an information block 80 for coupon placement. A coupon 78 including a coupon barcode 82 uniquely identifying the coupon is releasably adhered to the information block 80 by the fugitive glue 72. The sample liquid packette 50 is substantially covered by the nonpermeable window 32 and substantially hermetically sealed between the first panel 28 and the second panel 38 by the first fold line 44, and the line of permanent glue 37 surrounding the sample liquid packette 50, such that a substantially leakproof containment pocket 73 is formed around the sample liquid packette 50. The sample liquid packette 50 includes a cover film laminated to a backing film and contains a volume of liquid, the sample liquid packette having a burst strength and providing a primary sealing means for containing the liquid during mailing. It has experimentally been found that a burst strength less than 1000 PSI is insufficient to meet the demands of the USPS letter size bulk mailing equipment. It has also been experimentally found that a burst strength of about 1500 PSI can meet the USPS requirements. In one embodiment, the sample liquid packette 50 includes three packette portions separated vertically as shown in the figures. Alignment of multiple packette portions vertically enables a manufacturer to provide samples of related products, such as a shampoo, a conditioner, and a cream. The tear string 71 shown in hidden lines provides an important convenience to consumers to allow them easy opening by simply pulling the tear string to tear the paperboard 12 from either end, the first tab 68 or the second tab 70, so that the liquid sample packette 50 can be removed from the sealed package. There are no perforations through the paperboard in between the first tab 68 and the second tab 70 so that the integrity of the moisture resistant coating 24 is intact over the hermetically sealed leakproof containment pocket 73 during the mailing process through delivery.

Figure 4:
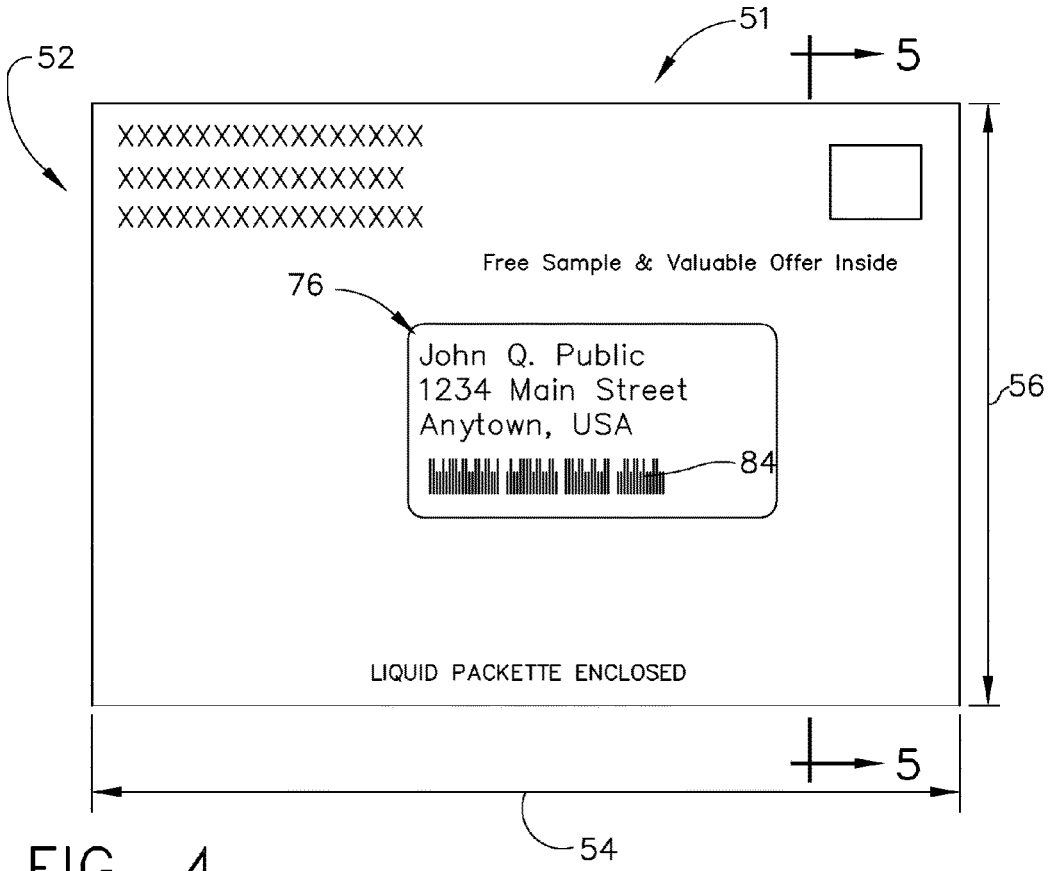
FIG. 4 is an illustration of an assembled liquid sample bulk mailing packaging device.

FIG. 4 shows a completely assembled liquid sample bulk mailing packaging device 51 as an envelope 52 formed from the envelope blank 10 after the coupon 78 is adhered to the information block 80 and the first panel 28 is folded along the third fold line 48 and glued to the fourth panel 42. The envelope 52 has a length 54 between 5 and 11.5 inches, a height 56 between 3.5 and 6.125 inches, and a thickness 58 as shown in the cross section of FIG. 5 no greater than 0.25 inches. An aspect ratio of the length divided by the height is between 1.3 and 2.5. In one embodiment, the length 54 is about 9 inches, the height 56 is about 6 inches, and the thickness 58 is no more than 0.25 inches. The liquid sample bulk mailing packaging device 51 has a weight no greater than 3.5 ounces, and has a flexibility sufficient to bend around an 11 inch diameter drum when subjected to a transport belt tension of 40 pounds. A targeted address 76 and associated address barcode 84 are applied to the address area 74 after successful completion of the assembly process including each of the first, second, and third folds to ensure the targeted address 76 can be linked to the coupon barcode 82 by a computer and stored in a computer database. Any envelope 52 that fails to complete the assembly process successfully can be discarded while ensuring targeted addresses with associated barcoded coupons are successfully included in the automated bulk mailing, thus enabling the manufacturer to efficiently mail samples and track coupon redemption directly to the consumer.

Figure 5:
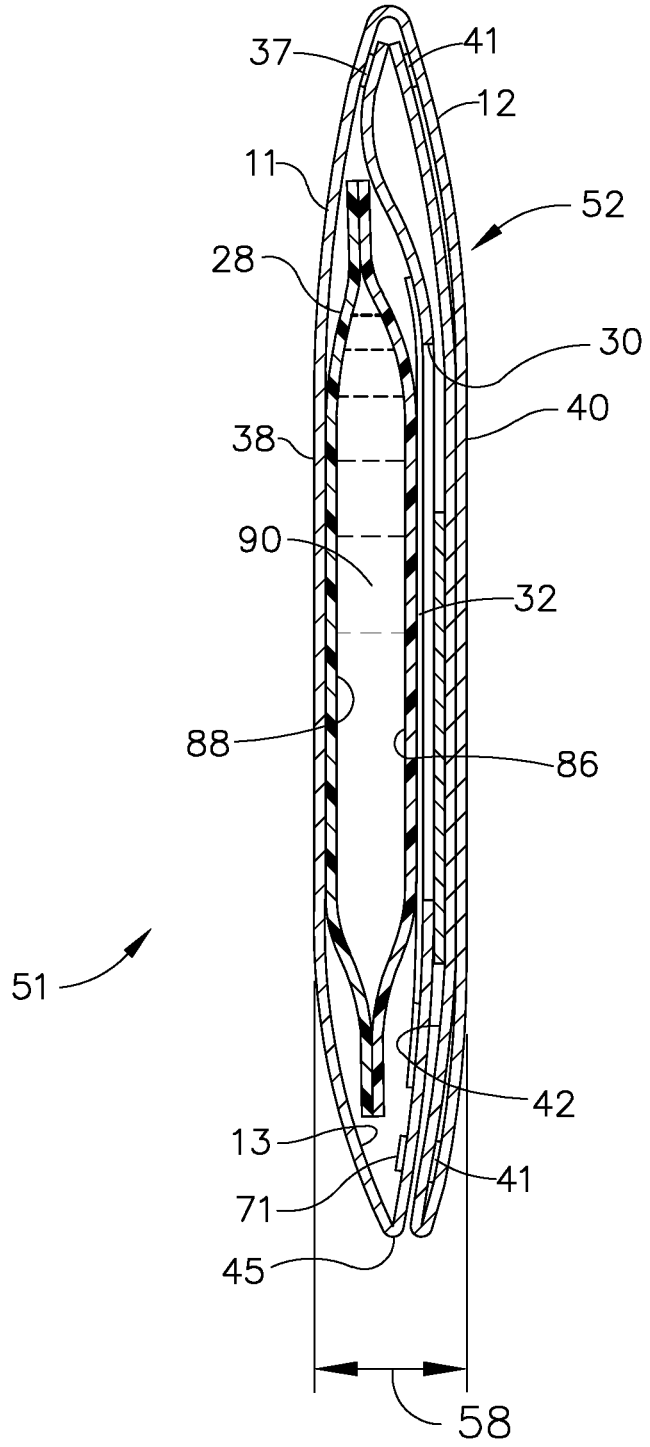
FIG. 5 is an illustration of cross-sectional view of the assembled bulk mailing packaging device taken along lines 5-5 in FIG. 4.

The liquid sample bulk mailing packaging device 51 shown in cross section in FIG. 5 illustrates the first panel 28 with its nonpermeable window 32 and second panel 38 forming a substantially leakproof containment pocket 73 in which sample liquid packette 50 is attached to the liquid packette mounting area 26. The sample liquid packette 50 has a cover film 86 laminated to a backing film 88 and holds a volume of liquid 90. The sample liquid packette 50 has a burst strength more than 1000 PSI and preferably at least about 1500 PSI as measured by ASTM testing method F-1140. In one embodiment, the paperboard 12 is solid bleached sulfate (SBS) clay coated, one side only, 0.012 inch thick. Print media is applied to the clay coated side, with an aqueous coating then applied to form the printed side 11. In the event the primary liquid retention from the sample liquid packette 50 fails, the liquid may leak into the substantially leakproof containment pocket 73 and may be absorbed by the paperboard 12. In order to absorb the liquid, the paperboard should have sufficient absorption capability to absorb the quantity of liquid contained within the sample liquid packette 50 with the semipermeable coating 18 and the moisture resistant coating 24 preventing transmission of the liquid 90 by leakage or evaporation through the paperboard 12 from the deposit time of the liquid sample bulk mailing packaging device 51 with the USPS through the mail sorting and delivery process to the ultimate recipient. Thus, it is not required that a moisture resistant coating 24 have indefinite moisture resistant capabilities, but should be durable enough to retain the liquid for at least about two weeks. One advantage of using the system is that it meets the USPS requirements for machinable and automation letters, whereas plastic wrapped envelopes do not meet this requirement.

Absorption capabilities of paperboard 12 is measured by the Cobb value in grams per square meter. A minimum Cobb value relative to the moisture content of the liquid volume contained in the sample liquid packette 50 will be apparent to those skilled in the art based on the teachings herein. Portions of the back side of the envelope blank 13 including within the liquid packette mounting area 26 may have printing or ink applied so long as a Cobb value sufficient to absorb the moisture content of the sample liquid packette 50 is retained, as such is not application of a coating that would inhibit absorption beyond that necessary to meet the USPS requirements. A Cobb value of at least about 50 g per square meter has been found sufficient in combination with a printed surface having a clay coating and aqueous moisture resistant coating, as the combined effect is to absorb moisture while retaining the liquid for the time necessary for the mailing process to be complete.

While specific embodiments of the present invention have been described, it will be apparent to those skilled in the art that various modifications thereto can be made without departing from the spirit and scope of the invention. Accordingly, the foregoing description of embodiments of the invention are provided for the purpose of illustration only and not for the purpose of limitation, the invention being defined by the claims.

What is claimed is:

1. An envelope blank comprising:

paperboard having a first side, a second opposite side, a top edge, a bottom edge, a first lateral edge, and an opposite second lateral edge;

the paperboard coated on the first side with a semi-permeable coating to form a printable surface;

print media placed on at least a portion of the printable surface;

a moisture resistant coating overlying the print media and semi-permeable coating;

a first panel extending from the top edge having a picture frame cutout with a non-permeable window adhered to the second side; and a second panel extending from the first panel with the second side having a liquid packette mounting area, with at least a portion of the paperboard in the liquid packette mounting area uncoated such that the uncoated portion is absorbent.

2. The envelope blank of claim 1 wherein the paperboard has a Cobb value of at least about 50 gm/square meter.

3. The envelope blank of claim 2 further comprising ink applied to color the liquid packette mounting area.

4. The envelope blank of claim 1 wherein the non-permeable window is formed from the group consisting of plastic and metalized plastic films.

5. The envelope blank of claim 4 wherein the non-permeable window is adhered to the second side by a permanent glue encircling the periphery of the picture frame cutout.

6. The envelope blank of claim 1 wherein the paperboard comprises solid bleached sulfate (SBS) paperboard and the semi-permeable coating is a clay coating.

7. The envelope blank of claim 1 wherein the moisture resistant coating is an aqueous coating.

8. The envelope blank of claim 1 die-cut in a substantially rectangular shape for folding into an envelope having a length, a height, and a thickness when enclosing a sample liquid packette, further comprising:

a third panel extending from the second panel towards the bottom edge;

a fourth panel extending from the third panel to the bottom edge;

a first fold line between the first panel and the second panel;

a second fold line between the third panel and the fourth panel;

a third fold line between the second panel and the third panel;

a first tab cut along the first lateral edge in the first panel proximate the first fold line;

a second tab opposite the first tab and cut along the second lateral edge in the first panel proximate the first fold line; and a tear string having a tensile strength greater than the paperboard tensile strength, the tear string adhered to the second side of the first panel extending from the first tab to the second tab.

9. The envelope blank of claim 8 wherein the tear string comprises a flat polyester ribbon, the tear string adhered by a permanent glue.

10. The envelope blank of claim 8 wherein the print media presents:

the first panel having an attractive display for the non-permeable window area;

the second panel having an attractive and informational graphic presentation, [appropriate marking for pre-sorted bulk mail treatment by the United States Postal Service including] a marking indicating a liquid sample is enclosed, and a blank area for subsequent address and barcode information; and attractive and informational graphic presentations in the third and fourth panels.

11. The envelope blank of claim 10 further comprising a fugitive glue applied to the second side of the second panel and a sample liquid packette adhered to the envelope blank by the fugitive glue.

12. The envelope blank of claim 11 wherein the sample liquid packette has a burst strength of at least about 1500 psi.

13. The envelope blank of claim 11 further comprising:

a line of permanent glue applied to the second side of the second panel around the sample liquid packette, from proximate the first fold line at a point inward of the first tab extending substantially diagonally outward, towards the first lateral edge, then extending towards the third fold line, then extending towards the second lateral edge, then extending towards the first fold line, then extending substantially diagonally inward to a point inward of the second tab; and permanent glue applied to the second side of the third panel proximate to and parallel with the third fold line, the second fold line, the first lateral edge, and the second lateral edge.

14. The envelope blank of claim 13 wherein:

the second side of the first panel is folded along the first fold line and glued to the second panel forming a leakproof containment pocket around the sample liquid packette, and the second side of the fourth panel is folded along the second fold line and glued to the third panel.

15. The envelope blank of claim 14 further comprising a coupon having a coupon barcode uniquely identifying the coupon, the coupon releasably adhered to the first side of the fourth panel by a fugitive glue.

16. A liquid sample bulk mailing packaging device formed from the envelope blank of claim 15, wherein the packaging device is formed from the envelope blank further comprising:

fugitive glue applied to spots on the first side of the first panel proximate the first lateral edge, the first fold line, and the second lateral edge;

the first side folded along the third fold line and glued to the first side of the fourth panel; and a targeted address and address barcode printed in the address area, wherein the coupon barcode is associated by a computer database with the address barcode.

17. The liquid sample bulk mailing packaging device of claim 16 forming an envelope having:

a length between 5 and 11.5 inches, a height between 3.5 and 6.125 inches, a thickness no greater than 0.25 inches, and a weight no greater than 3.5 ounces, wherein an aspect ratio of the length divided by the height is between 1.3 and 2.5; and wherein the liquid sample bulk mailing packaging device has flexibility sufficient to bend around an 11 inch diameter drum when subjected to a transport belt tension of 40 pounds.

18. A liquid sample bulk mailing packaging device comprising:

an envelope blank comprising paperboard having a semi-permeable coated first side forming a printable surface, print media placed on at least a portion of the printable surface, a moisture resistant coating overlying the print media and semi-permeable coating, and an uncoated second side providing a moisture absorbing surface, the envelope blank having a first panel extending from a top edge and a second panel adjacent the first panel;

a sample liquid packette comprising a cover film laminated to a backing film and containing a volume of sample liquid, the sample liquid packette having a burst strength and providing a primary sealing means for containing the sample liquid during mailing, the sample liquid packette adhered to a packette mounting area on the second side of the second panel by a fugitive glue; and a permanent glue applied to the perimeter of the packette mounting area from a fold line between the first panel and the second panel, such that the sample liquid packette is encircled by the fold line and the permanent glue, the first panel folded to and glued to the second panel packette mounting area forming a hermetic seal around the sample liquid packette, the hermetic seal providing a secondary sealing means to prevent leakage of liquid from the sample liquid packette from the liquid sample bulk mailing packaging device;

wherein the liquid sample bulk mailing packaging device is not greater than ¼ inch thick [and is within the United States Postal Service requirements for Automation letters].

19. The liquid sample bulk mailing packaging device of claim 18 wherein the paperboard comprises solid bleached sulfate (SBS) paperboard capable of absorbing the moisture contained within the sample liquid packette.

20. The liquid sample bulk mailing packaging device of claim 18 wherein the paperboard has a Cobb value of at least about 50 gm/square meter.

[21. The liquid sample bulk mailing packaging device of claim 20 wherein the burst strength exceeds 1000 psi as defined by ASTM testing method F-1140.]

22. The liquid sample bulk mailing packaging device of claim 18 further comprising:

a third panel extending from the second panel and a fourth panel extending from the third panel, the second side of the fourth panel folded to and glued to the second side of the third panel; and the first panel having a picture frame cut-out with a non-permeable window adhered to the second side.

23. The liquid sample bulk mailing device of claim 22 further comprising:

a first tab cut along a first lateral edge and a second tab cut along an opposite second lateral edge in the first panel proximate the fold line between the first panel and the second panel, and a tear string comprising a string material having a tensile strength greater than a tensile strength of the paperboard, the tear string adhered to the second side of the first panel by a permanent glue and extending from the first tab to the second tab.

24. The liquid sample bulk mailing packaging device of claim 18 wherein the sample liquid is selected from the group comprising liquids, creams, lotions, color cosmetics, gels, paste, and other fluid products.

25. The liquid sample bulk mailing packaging device of claim 18 wherein the sample liquid is selected from the group comprising aromatics, fragrances, and other volatile products in any form.

26. A method of assembling a liquid sample bulk mailing packaging device comprising:

providing an envelope blank formed from paperboard clay coated on a first side and uncoated on the opposite second side, preprinted with print media on the clay coated side providing attractive and informational graphic presentations in a first, second, third, and fourth panel area, having a moisture resistant coating overlying the print media, and having the first panel including a non-permeable window adhered to the second side by a permanent glue, the envelope blank having a top edge, a bottom edge, a first lateral edge, and an opposite second lateral edge;

cutting a first tab along the first lateral edge in the first panel, proximate a fold line between the first panel and the second panel, and a second tab opposite the first tab along the second lateral edge, and adhering a string to the second side extending from the first tab to the second tab with a permanent glue;

applying a fugitive glue to the second side of the second panel;

placing a sample liquid packette on the fugitive glue in the second panel;

applying a line of permanent glue to the second side of the second panel around from a first fold line between the first and second panels at a point inward of the first tab extending around the sample liquid packette to a point inward of the second tab;

applying permanent glue to the second side of the third panel proximate to and parallel with the third fold line, a fourth fold line, the first lateral edge, and the second lateral edge;

folding the second side of the first panel towards the second panel and pressing the periphery of the first panel to adhere a first panel to the second panel with the permanent glue;

folding the second side of the fourth panel towards the third panel and pressing the periphery of the fourth panel to adhere the fourth panel to the third panel with the permanent glue;

applying a fugitive glue to the first side of the first panel;

folding the first side of the first panel towards the fourth panel and adhering the panels together with the fugitive glue; and printing address the information in an address area on the first side of the second panel.

27. The method of claim 26 further comprising adhering a coupon to the first side of the fourth panel with fugitive glue.

28. The method of claim 27 further comprising correlating the coupon to addressee information in a computer database.

29. A liquid sample bulk mailing packaging device comprising:

an envelope blank comprising paperboard having a semi-permeable coated first side forming a printable surface, print media placed on at least a portion of the printable surface, and an uncoated second side providing a moisture absorbing surface, the envelope blank having a first panel extending from a top edge and a second panel adjacent the first panel;

a sample liquid packette comprising a cover film laminated to a backing film and containing a volume of sample liquid, the sample liquid packette having a burst strength and providing a primary sealing means for containing the sample liquid during mailing, the sample liquid packette adhered to a packette mounting area on the second side of the second panel; and a permanent glue applied to the perimeter of the packette mounting area from a fold line between the first panel and the second panel, such that the sample liquid packette is encircled by the fold line and the permanent glue, the first panel folded to and glued to the second panel packette mounting area forming a hermetic seal around the sample liquid packette, the hermetic seal providing a secondary sealing means to prevent leakage of liquid from the sample liquid packette from the liquid sample bulk mailing packaging device;

wherein the liquid sample bulk mailing packaging device is not greater than ¼ inch thick [and is within the United States Postal Service requirements for Automation letters].

*30. An envelope blank comprising:*

*paperboard having a first side, a second opposite side, a top edge, a bottom edge, a first lateral edge, and an opposite second lateral edge;*

*the paperboard coated on the first side with a semi-permeable coating to form a printable surface;*

*print media placed on at least a portion of the printable surface;*

*a moisture resistant coating overlying the print media and semi-permeable coating;*

*a first panel extending from the top edge having a picture frame cutout with a non-permeable window adhered to the second side; and*

*a second panel extending from the first panel with the second side having a liquid packette mounting area.*

*31. The envelope blank of claim 30 further comprising ink applied to color the liquid packette mounting area.*

*32. The envelope blank of claim 30 wherein the non-permeable window is formed from the group consisting of plastic and metalized plastic films.*

*33. The envelope blank of claim 32 wherein the non-permeable window is adhered to the second side by a permanent glue encircling the periphery of the picture frame cutout.*

*34. The envelope blank of claim 30 wherein the paperboard comprises solid bleached sulfate (SBS) paperboard and the semi-permeable coating is a clay coating.*

*35. The envelope blank of claim 30 wherein the moisture resistant coating is an aqueous coating.*

*36. The envelope blank of claim 30 die-cut in a substantially rectangular shape for folding into an envelope having a length, a height, and a thickness when enclosing a sample liquid packette, further comprising:*

*a third panel extending from the second panel towards the bottom edge;*

*a fourth panel extending from the third panel to the bottom edge;*

*a first fold line between the first panel and the second panel;*

*a second fold line between the third panel and the fourth panel;*

*a third fold line between the second panel and the third panel;*

*a first tab cut along the first lateral edge in the first panel proximate the first fold line;*

*a second tab opposite the first tab and cut along the second lateral edge in the first panel proximate the first fold line; and*

*a tear string having a tensile strength greater than the paperboard tensile strength, the tear string adhered to the second side of the first panel extending from the first tab to the second tab.*

*37. The envelope blank of claim 36 wherein the tear string comprises a flat polyester ribbon, the tear string adhered by a permanent glue.*

*38. The envelope blank of claim 36 wherein the print media presents:*

*the first panel having an attractive display for the non-permeable window area;*

*the second panel having an attractive and informational graphic presentation, a marking indicating a liquid sample is enclosed, and a blank area for subsequent address and barcode information; and*

*attractive and informational graphic presentations in the third and fourth panels.*

*39. The envelope blank of claim 38 further comprising a fugitive glue applied to the second side of the second panel and a sample liquid packette adhered to the envelope blank by the fugitive glue.*

*40. The envelope blank of claim 39 further comprising:*

*a line of permanent glue applied to the second side of the second panel around the sample liquid packette, from proximate the first fold line at a point inward of the first tab extending substantially diagonally outward, towards the first lateral edge, then extending towards the third fold line, then extending towards the second lateral edge, then extending towards the first fold line, then extending substantially diagonally inward to a point inward of the second tab; and*

*permanent glue applied to the second side of the third panel proximate to and parallel with the third fold line, the second fold line, the first lateral edge, and the second lateral edge.*

*41. The envelope blank of claim 40 wherein:*

*the second side of the first panel is folded along the first fold line and glued to the second panel forming a leakproof containment pocket around the sample liquid packette, and*

*the second side of the fourth panel is folded along the second fold line and glued to the third panel.*

*42. The envelope blank of claim 41 further comprising a coupon having a coupon barcode uniquely identifying the coupon, the coupon releasably adhered to the first side of the fourth panel by a fugitive glue.*

*43. A liquid sample bulk mailing packaging device formed from the envelope blank of claim 42, wherein the packaging device is formed from the envelope blank further comprising:*

*fugitive glue applied to spots on the first side of the first panel proximate the first lateral edge, the first fold line, and the second lateral edge;*

*the first side folded along the third fold line and glued to the first side of the fourth panel; and*

*a targeted address and address barcode printed in the address area, wherein the coupon barcode is associated by a computer database with the address barcode.*

*44. The liquid sample bulk mailing packaging device of claim 43 forming an envelope having:*

*a length between 5 and 11.5 inches,*

*a height between 3.5 and 6.125 inches,*

*a thickness no greater than 0.25 inches, and*

*a weight no greater than 3.5 ounces,*

*wherein an aspect ratio of the length divided by the height is between 1.3 and 2.5; and*

*wherein the liquid sample bulk mailing packaging device has flexibility sufficient to bend around an 11 inch diameter drum when subjected to a transport belt tension of 40 pounds.*

*45. A liquid sample bulk mailing packaging device comprising:*

*an envelope blank comprising paperboard having a semi-permeable coated first side forming a printable surface, print media placed on at least a portion of the printable surface, a moisture resistant coating overlying the print media and semi-permeable coating, and having a second side, the envelope blank having a first panel extending from a top edge and a second panel adjacent the first panel;*

*a sample liquid packette comprising a cover film laminated to a backing film and containing a volume of sample liquid, the sample liquid packette having a burst strength and providing a primary sealing means for containing the sample liquid during mailing, the sample liquid packette adhered to a packette mounting area on the second side of the second panel by a fugitive glue; and*

*a permanent glue applied to the perimeter of the packette mounting area from a fold line between the first panel and the second panel, such that the sample liquid packette is encircled by the fold line and the permanent glue, the first panel folded to and glued to the second panel packette mounting area forming a hermetic seal around the sample liquid packette, the hermetic seal providing a secondary sealing means to prevent leakage of liquid from the sample liquid packette from the liquid sample bulk mailing packaging device;*

*wherein the liquid sample bulk mailing packaging device is not greater than ¼ inch thick.*

*46. The liquid sample bulk mailing packaging device of claim 45 further comprising:*

*a third panel extending from the second panel and a fourth panel extending from the third panel, the second side of the fourth panel folded to and glued to the second side of the third panel; and*

*the first panel having a picture frame cut-out with a nonpermeable window adhered to the second side.*

*47. The liquid sample bulk mailing device of claim 46 further comprising:*

*a first tab cut along a first lateral edge and a second tab cut along an opposite second lateral edge in the first panel proximate the fold line between the first panel and the second panel, and*

*a tear string comprising a string material having a tensile strength greater than a tensile strength of the paperboard, the tear string adhered to the second side of the first panel by a permanent glue and extending from the first tab to the second tab.*

*48. The liquid sample bulk mailing packaging device of claim 45 wherein the sample liquid is selected from the group comprising liquids, creams, lotions, color cosmetics, gels, paste, and other fluid products.*

*49. The liquid sample bulk mailing packaging device of claim 45 wherein the sample liquid is selected from the group comprising aromatics, fragrances, and other volatile products in any form.*

*50. A method of assembling a liquid sample bulk mailing packaging device comprising:*

*providing an envelope blank formed from paperboard clay coated on a first side and an opposite second side, preprinted with print media on the first side providing attractive and informational graphic presentations in a first, second, third, and fourth panel area, having a moisture resistant coating overlying the print media, and having the first panel including a non-permeable window adhered to the second side by a permanent glue, the envelope blank having a top edge, a bottom edge, a first lateral edge, and an opposite second lateral edge;*

*cutting a first tab along the first lateral edge in the first panel, proximate a fold line between the first panel and the second panel, and a second tab opposite the first tab along the second lateral edge, and adhering a string to*

*the second side extending from the first tab to the second tab with a permanent glue;*

*applying a fugitive glue to the second side of the second panel;*

*placing a sample liquid packette on the fugitive glue in the second panel;*

*applying a line of permanent glue to the second side of the second panel around from a first fold line between the first and second panels at a point inward of the first tab extending around the sample liquid packette to a point inward of the second tab;*

*applying permanent glue to the second side of the third panel proximate to and parallel with the third fold line, a fourth fold line, the first lateral edge, and the second lateral edge;*

*folding the second side of the first panel towards the second panel and pressing the periphery of the first panel to adhere a first panel to the second panel with the permanent glue;*

*folding the second side of the fourth panel towards the third panel and pressing the periphery of the fourth panel to adhere the fourth panel to the third panel with the permanent glue;*

*applying a fugitive glue to the first side of the first panel;*

*folding the first side of the first panel towards the fourth panel and adhering the panels together with the fugitive glue; and*

*printing address the information in an address area on the first side of the second panel.*

*51. The method of claim 50 further comprising adhering a coupon to the first side of the fourth panel with fugitive glue.*

*52. The method of claim 51 further comprising correlating the coupon to addressee information in a computer database.*

*53. A liquid sample bulk mailing packaging device comprising:*

*an envelope blank comprising paperboard having a semi-permeable coated first side forming a printable surface, print media placed on at least a portion of the printable surface, and having a second side, the envelope blank having a first panel extending from a top edge and a second panel adjacent the first panel;*

*a sample liquid packette comprising a cover film laminated to a backing film and containing a volume of sample liquid, the sample liquid packette having a burst strength and providing a primary sealing means for containing the sample liquid during mailing, the sample liquid packette adhered to a packette mounting area on the second side of the second panel; and*

*a permanent glue applied to the perimeter of the packette mounting area from a fold line between the first panel and the second panel, such that the sample liquid packette is encircled by the fold line and the permanent glue, the first panel folded to and glued to the second panel packette mounting area forming a hermetic seal around the sample liquid packette, the hermetic seal providing a secondary sealing means to prevent leakage of liquid from the sample liquid packette from the liquid sample bulk mailing packaging device;*

*wherein the liquid sample bulk mailing packaging device is not greater than ¼ inch thick.*

* * * * *